US012586551B2

(12) United States Patent
Grossman

(10) Patent No.: US 12,586,551 B2
(45) Date of Patent: Mar. 24, 2026

(54) INSTRUMENT STAND ADAPTER BASE

(71) Applicant: Richard D. Grossman, Granada Hills, CA (US)

(72) Inventor: Richard D. Grossman, Granada Hills, CA (US)

( * ) Notice: Subject to any disclaimer, the term of this patent is extended or adjusted under 35 U.S.C. 154(b) by 277 days.

(21) Appl. No.: 18/232,560

(22) Filed: Aug. 10, 2023

(65) Prior Publication Data

US 2025/0054470 A1 Feb. 13, 2025

(51) Int. Cl.
*G10G 5/00* (2006.01)
*G10D 13/14* (2020.01)

(52) U.S. Cl.
CPC ............. *G10G 5/005* (2013.01); *G10D 13/14* (2020.02)

(58) Field of Classification Search
CPC ........... G10G 5/005; G10G 5/00; G10D 13/14
See application file for complete search history.

(56) References Cited

U.S. PATENT DOCUMENTS 3,784,068 A 1/1974 Pistill
4,730,532 A * 3/1988 Bauerfeind .......... G10D 13/065 984/154
4,776,254 A 10/1988 Cruz
5,637,819 A 6/1997 Rogers
5,814,744 A 9/1998 Hoke, Jr.
6,239,343 B1 5/2001 Hoshino
6,686,528 B1 2/2004 Dicken
6,720,491 B1 4/2004 Kroncke
7,151,211 B2 12/2006 Whittington et al.
8,141,548 B2 3/2012 Leven
8,415,548 B2 4/2013 Johansen
8,875,837 B2 11/2014 Moore et al.
10,565,969 B1 2/2020 Gregory
2002/0139237 A1 10/2002 Momchilovich
2010/0005948 A1 * 1/2010 Romolino ............ G10D 13/065 84/422.3
2015/0198211 A1 7/2015 Beaulieu

* cited by examiner

*Primary Examiner* — Kimberly R Lockett
(74) *Attorney, Agent, or Firm* — YK Law

(57) ABSTRACT

An instrument stand adapter base that improves the mounting of conventional drum support stands especially when the stands are positioned around a drum set. The instrument stand adapter base has a significantly smaller footprint compared to typical three leg stands, and can have the ability to dampen vibrations when a percussion instrument is struck. In the preferred embodiment, the instrument stand adapter base is comprised of the following: an angled brace, a collar base with at least one retaining collar or hinged two-piece pivoting clamp, a magnet assembly including an on-off switch that controls the operation of a magnet, a base plate with securing means, a support base, and a vertical strut having extrusions with a profile into which shaped nuts can be inserted to hold items. A dampening rod with a dampening mass can be secured to an upper end of the rod to provide adjustable vibration.

24 Claims, 11 Drawing Sheets

INSTRUMENT STAND ADAPTER BASE

TECHNICAL FIELD

The invention generally pertains to stands for musical instruments, and more particularly to a positionable stand for musical instruments, especially for percussion instruments such as cymbals or snare drums, while providing a reduction in unwanted harmonics, and magnetic means for securing the stand in an upright position, thus providing a much smaller footprint than achievable with conventional leg braced stands.

BACKGROUND ART

Most drum support stands currently used by drummers consist of a folding three leg base attached to a vertical, extensible, tubular member to which percussion instruments, such as cymbals and snare drums attached at the top of the stand by means of fittings. This enables the instrument to be positioned at different heights and angles. The three legs are generally attached to the tubular element by two metal self-tapping screws coupled with a small amount of adhesive. The ability of the legs to fold and unfold is achieved by means of separate links secured by rivets. This enables drummers to fold and collapse their stands after a performance for storage and/or transport.

A major disadvantage of these types of stands is that the legs, when opened, require a significant amount of space at the base of the stands. As a result, drummers are limited when playing a snare drum as to where they can place their feet. Also, when opened, the legs limit the positioning of the stand close to the drummer and other drums. Also three leg stands tend to “walk” as the result of the instrument being struck.

An added disadvantage is that, as a percussion instrument is struck (with or without drumsticks, whisks, etc.), it vibrates and, in turn, produces sound waves-pressure vibrations carried in air. Consequently, a portion of the energy required to produce the sound waves is transmitted to the support stand, causing it to vibrate. The effect of this second set of vibrations is to dampen and change the tonal character of the instrument.

And finally, as a result of the design of most conventional three leg stands, there is unwanted flex from the legs themselves due to the pivots required to allow the inward folding of the legs.

A search of the prior art did not disclose any literature or patents that read directly on the claims of the instant invention. However, the following U.S. patents are considered related:

| PAT. NO. | INVENTOR | ISSUED |
|---|---|---|
| 7,151,211 | Whittington, et al | Dec. 19, 2006 |
| 8,141,548 | Leven | Mar. 27, 2012 |
| 10,565,969 | Gregory | Feb. 18, 2020 |

The U.S. Pat. No. 7,151,211 discloses a device for dampening sounds produced by a musical drum having a drumshell comprising a frame assembly having a first elongated bar member with a first channel and a second elongated bar member with a second channel. The two bar members are in opposed parallel relation. Mounting brackets are affixed secured to the two bar members at their opposing ends. Attached, to the two mounting brackets opposing ends of an assembly of snare wires. The mounting brackets also connect the assembly to the drumshell and are adjustable. The dampening member is comprised of a base member, a device for physically contacting the snare wires as it is moved along the frame assembly and a resilient material situated between the base member and the contact device to buffer vibrations produced by the struck drumhead.

The U.S. Pat. No. 8,141,548 discloses a vibration dampener including en elastomeric body having a top and bottom surface and a vibration transfer plate on the top surface of the body. The bottom surface of the body can be provided with a mounting base and is for being mounted to an object to be vibration controlled.

The U.S. Pat. No. 10,565,969 discloses a cymbal dampening system that is configured to alter sound vibration of a cymbal. The system has a first dampening bracket joined to a first wrap having a first pad that is adjacent to the cymbal. A second dampening bracket is jointed to the first dampening bracket and a third dampening bracket. The second bracket is joined to a second pad and the third bracket is joined to a third pad. The first pad, the second pad and the third pad alter sound vibration of the cymbal when struck.

For background purposes and indicative of the art to which the invention relates, reference may be made to the following remaining patents found in the patent search.

| PAT. NO. | INVENTOR | ISSUED |
|---|---|---|
| 3,784,068 | Pistill | Jan. 8, 1974 |
| 4,776,254 | Cruz | Oct. 11, 1968 |
| 5,637,819 | Rogers | Jan. 10, 1997 |
| 5,814,744 | Hoke, Jr. | Sep. 29, 1998 |
| 6,239,343 | Hoshino | May 29, 2001 |
| 6,686,528 | Dicken | Feb. 3, 2004 |
| 6,720,491 | Kroncke | Apr. 13, 2004 |
| 8,415,548 | Johansen | Apr. 9, 2013 |
| 8,875,837 | Moore, et al | Nov. 4, 2014 |
| 2002/0139237 | Momchilovich | Oct. 3, 2002 |
| 2015/0198211 | Beaulieu | Jul. 16, 2015 |

DISCLOSURE OF THE INVENTION

An instrument stand adapter base that is designed to hold an instrument, particularly a percussive instrument such as a cymbal or a snare drum. The percussive instrument is maintained in a playable/useable position by means of a magnet which attaches a vertical strut and base plate at its lower end. The upper portion of the strut attaches to the tube supporting the instrument. Consequently, the stand take sup significantly less floor space than conventional stands adapter base which typically utilize three legs that fold outward while providing a stiffer structure. As such, the subject invention changes the acoustic character of the sound emanating from the instrument, generally providing enhanced acoustical performance. Additionally, the instrument stand can offer additional vibration dampening including a dampening rod with a dampening mass on its upper end, which is adjustable in height positioning for tuning.

The instrument stand adapter base does not require a large number of elements, and is comprised of an angled brace, a collar base that includes at least retaining collar style clamp which can be a one-piece clamp-on shaft collar, a two-piece clamp-on shaft collar, a hinged clamp-on shaft collar or a hinged two-piece pivoting clamp, least one magnet assembly with a magnet and an on-off switch, a base plate with securing means, a support base and vertical strut having an extrusion with a profile into which shaped nuts can be inserted for attaching items.

A second/alternate design configuration of the instrument stand adapter base includes the ability to further reduce vibrations that are produced when a cymbal is struck. In order to dampen/reduce vibrations, a dampening rod is added to the instrument stand adapter base structure. To increase the effectiveness of the dampening rod, a dampening mass such as a hollow metal ball can be secured to the upper end of the dampening rod, and to improve the dampening, a quantity of microspheres can be placed within the dampening mass.

A major benefit of the instrument stand adapter base is that a drummer is able to use stands they currently use but without the legs and now have the ability to put the stands exactly where they want them, because the footprint of the instrument stand adapter base is so greatly reduced, and the stands can be placed in the exact same position every time. This speeds up the set up of the drum kit which is very beneficial when playing on the road.

Another benefit to the instrument stand adapter base is the base system that is much more rigid and has greater support for the upper sections of typical cymbal, spare, hi hat and drum throne stands especially when they are used together as an assembly, typically a drum kit. Additionally, with the unique instrument stand adapter base design there is no need for rubber feet between the stand(s) and a floor surface. The ends of a typical three leg stand require rubber feet so they do not move around during play. By not requiring rubber feet there is no unwanted dampening of the drums and cymbals.

In view of the above disclosure the primary object of the invention is to provide an instrument stand adapter base, especially for percussive instruments such as cymbals or snare drums, that greatly reduces the footprint compared to conventional three leg stands, and can optionally provide vibration dampening.

In addition to the primary object, it is also an object of the invention to provide an instrument stand adapter base that:

- is easy to assemble and use,
- can be used with various percussive instruments including cymbals, snare drums, hi-hats or drum thrones,
- can be easily transported,
- allows for a larger number of instruments to be placed in a location compared to conventional stands.
- can be sold as an aftermarket product or as part of a drum kit.
- improves the sound of an instrument on the stand,
- can be painted/colored to match or accent other drum hardware,
- is robost and long-lasting,
- is cost effective from both a manufacturer's and consumer's point of view.

These and other objects and advantages of the present invention will become apparent from the subsequent detailed description of the preferred embodiment and the appended claims taken in conjunction with the accompanying drawings.

BEST MODE FOR CARRYING OUT THE INVENTION

Figure 1:
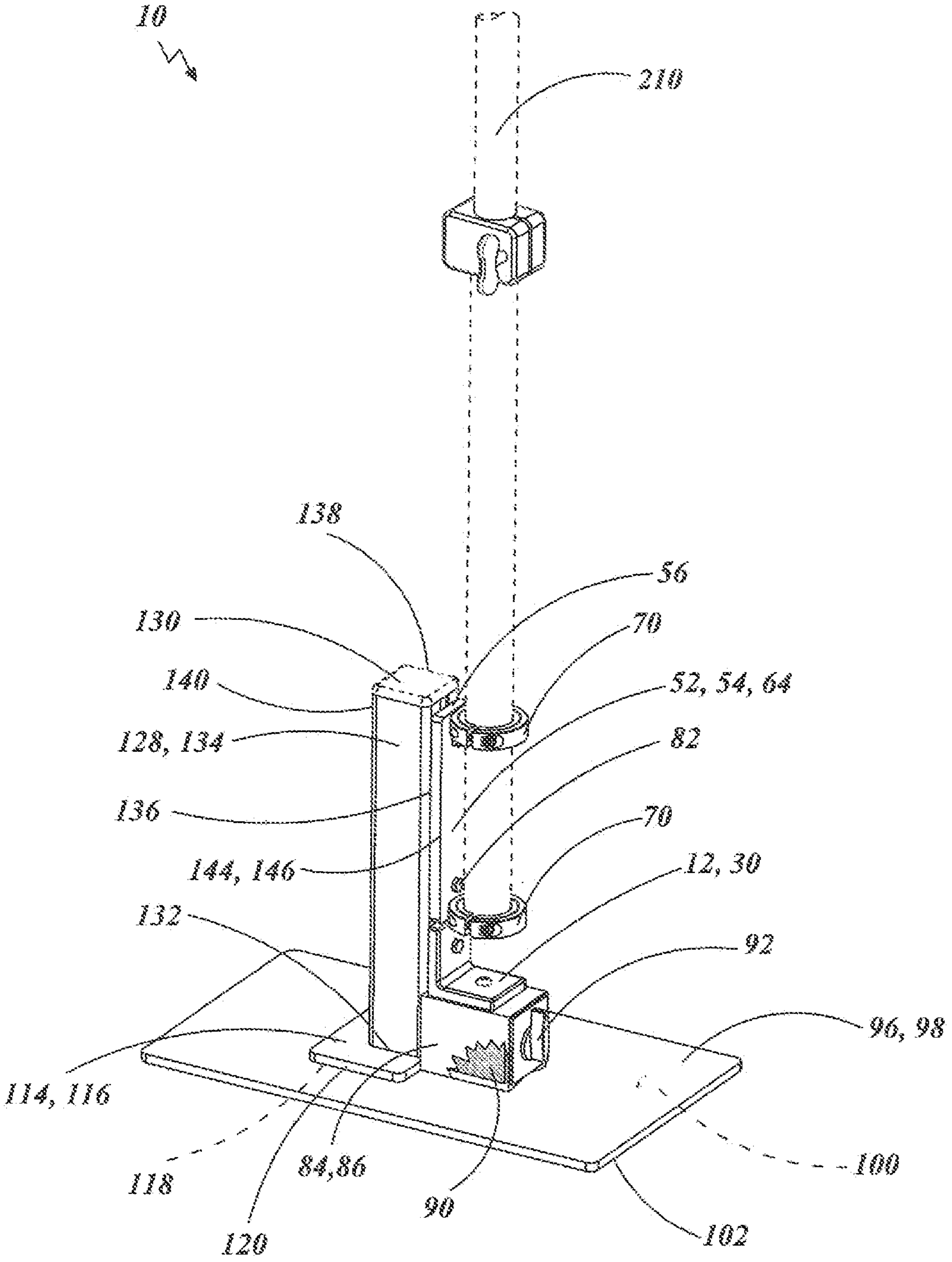
FIG. 1 is an orthographic view showing a first design configuration of an instrument stand adapter base (ISAB).
Figure 2:
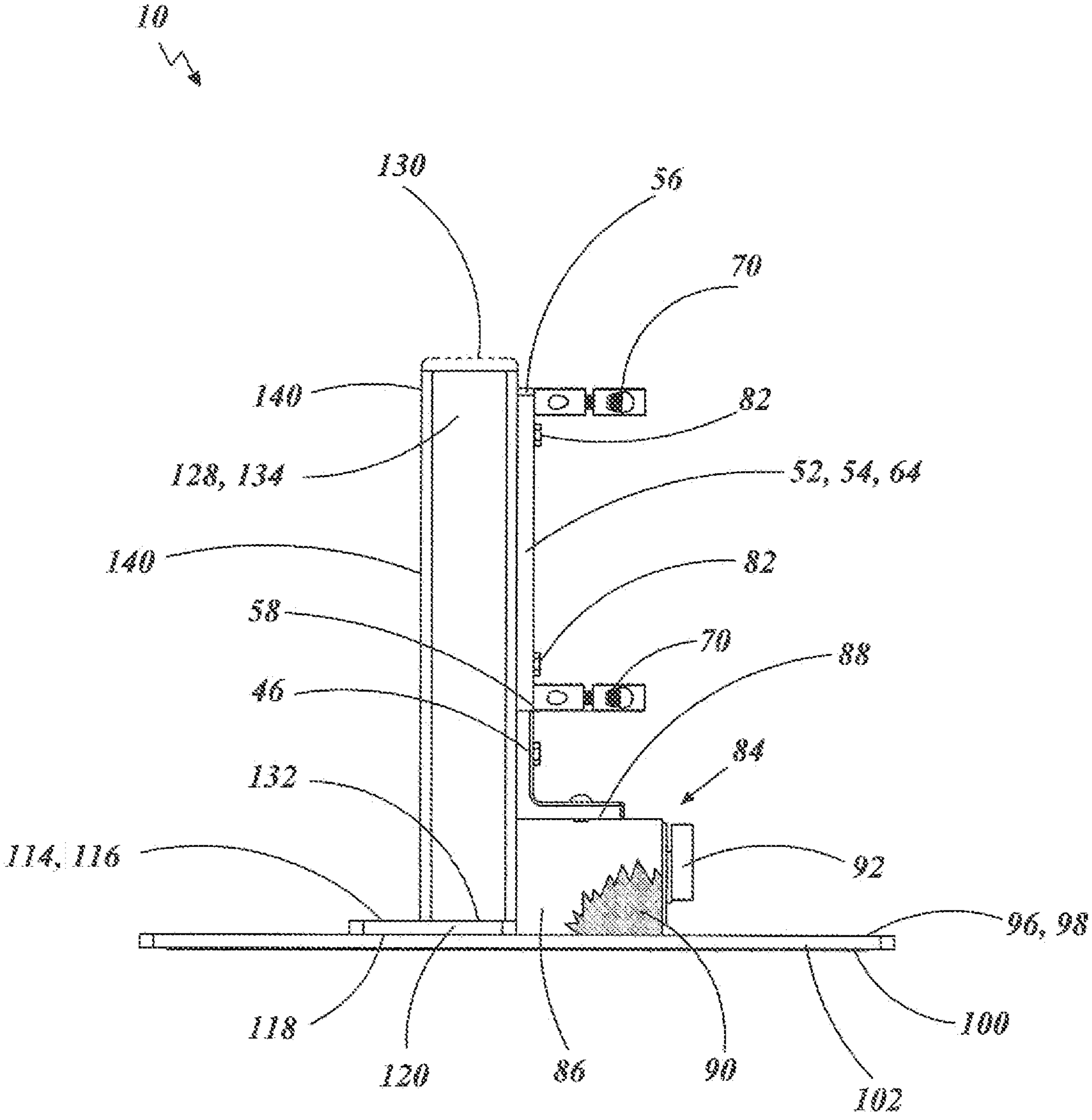
FIG. 2 is an elevational right side view showing the first design configuration of the ISAB.
Figure 3:
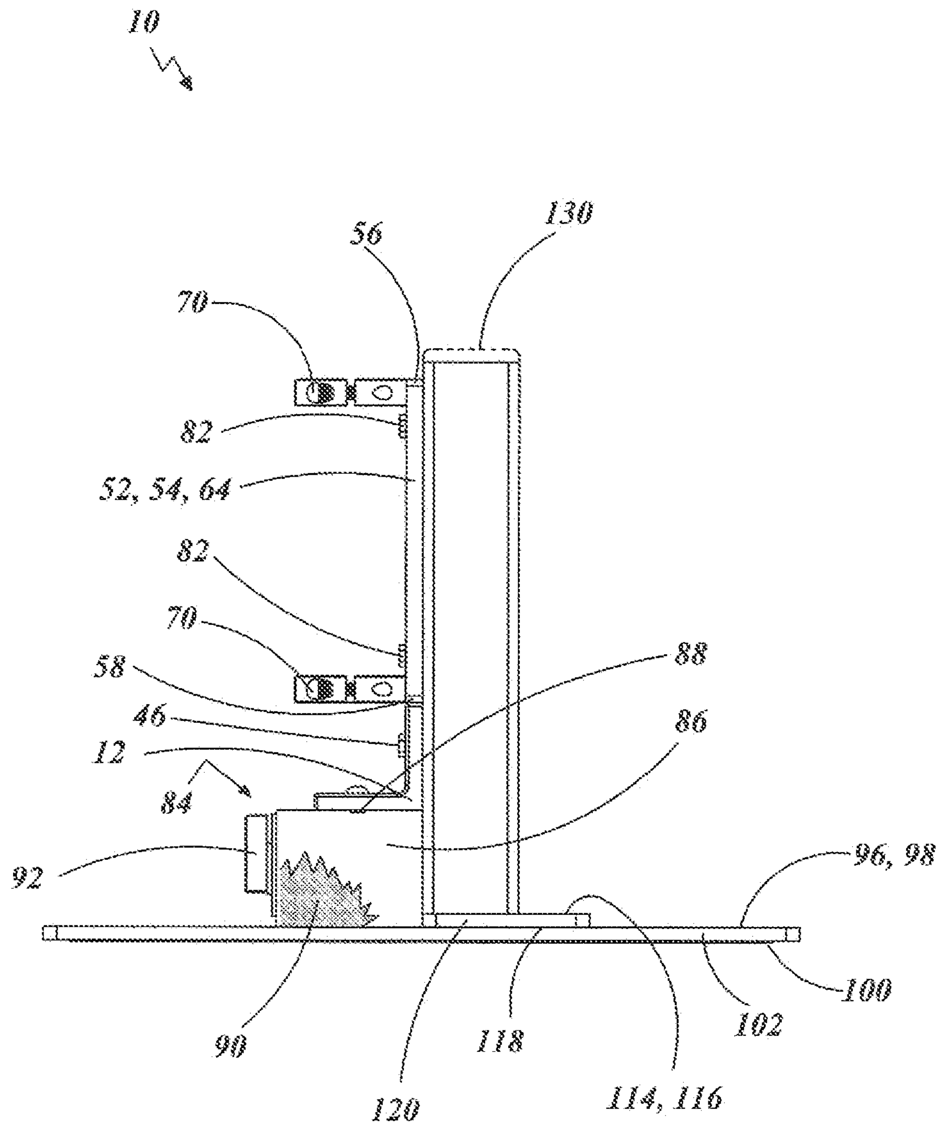
FIG. 3 is an elevational left side view showing the first design configuration of the ISAB.
Figure 4:
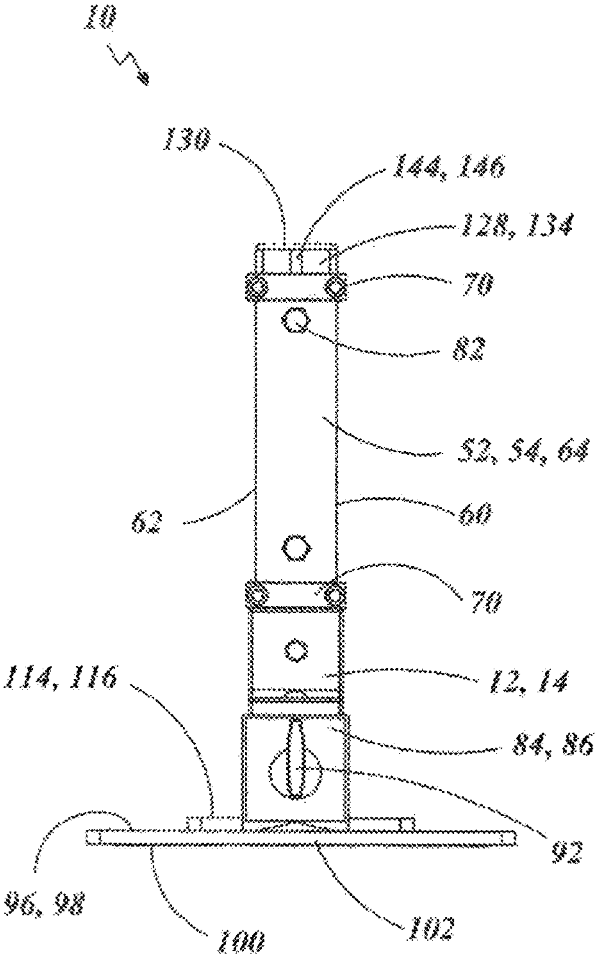
FIG. 4 is an elevational front view showing the first design configuration of the ISAB.
Figure 5:
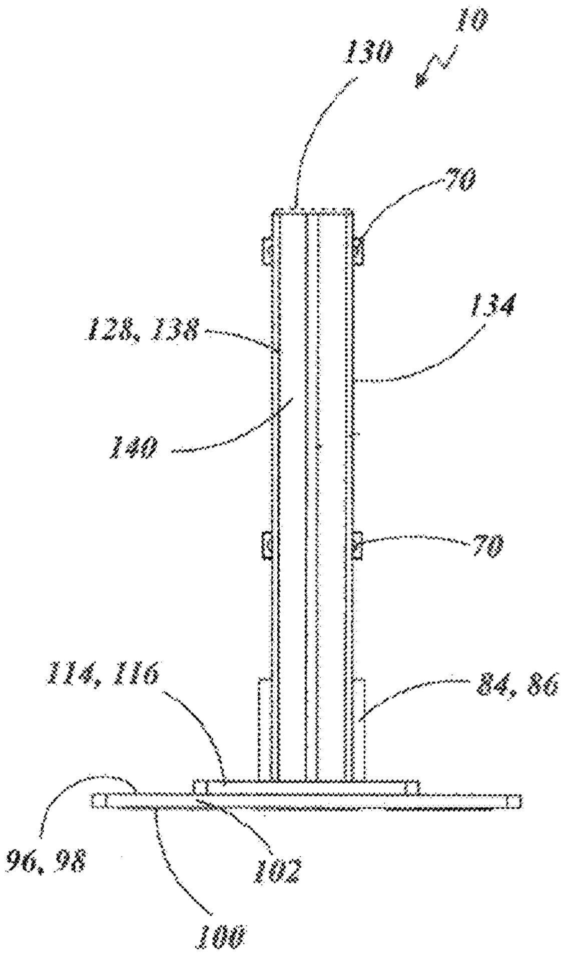
FIG. 5 is an elevational rear view showing the first design configuration of the ISAB.
Figure 6:
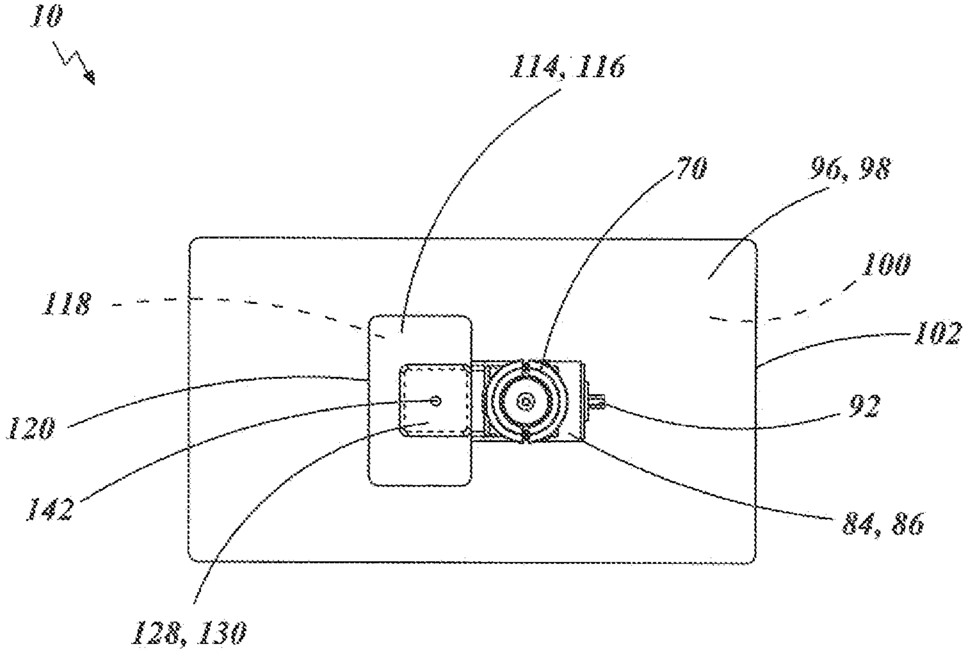
FIG. 6 is a top plan view showing the first design configuration of the ISAB.

The best mode for carrying out the invention is presented in terms that disclose a preferred embodiment with two design configurations of an instrument stand adapter base. The design of the instrument stand adapter base, known as the MagStand, allows it to be used with conventional stands utilized for cymbals or snare drums.

The instrument stand adapter bases, as shown in FIGS. 1-17, uses certain standard stand hardware but without the stand's outward pivoting/fold away legs which must be removed. The instrument stand adapter base uses standard materials that have never been used in this field for percussion stand support before.

Some of the problems that drummers and their drum techs experience is the difficulty in acquiring the exact same placement of the stands for each use, and that many times the outward legs supporting the stands get in the way of both the drummer's own feet as well as other stands and the drums they maintain. The instrument stand adapter base offers solutions to these problems by providing a cymbal or snare stand that requires much less floor space, is easy to assemble and use, and that can provide optional vibration dampening.

The first design configuration of the instrument stand adapter base 10, as shown in FIGS. 1-7, is comprised of the following major elements: an angled brace 12, a collar base

52 with at least two retaining collars 70, at least one magnet assembly 84, a base plate 96, a support base 114, and a vertical strut 128.

The angled brace 12 is shaped as a 90° L and is attached to the vertical strut 128 by attachment means 46 such as at least one screw, and includes a vertical section 14 with an upper edge 16, a lower edge 18, a first side edge 20, a second side edge 22, a front surface 24, a rear surface 26, and at least one opening 28. A horizontal section 30 extends outward from the lower edge 18 of the vertical section 14, and has a front edge 32, a rear edge 34, a first side edge 36, a second side edge 38, an upper surface 40, a lower surface 42, and at least one opening 44.

Figure 14:
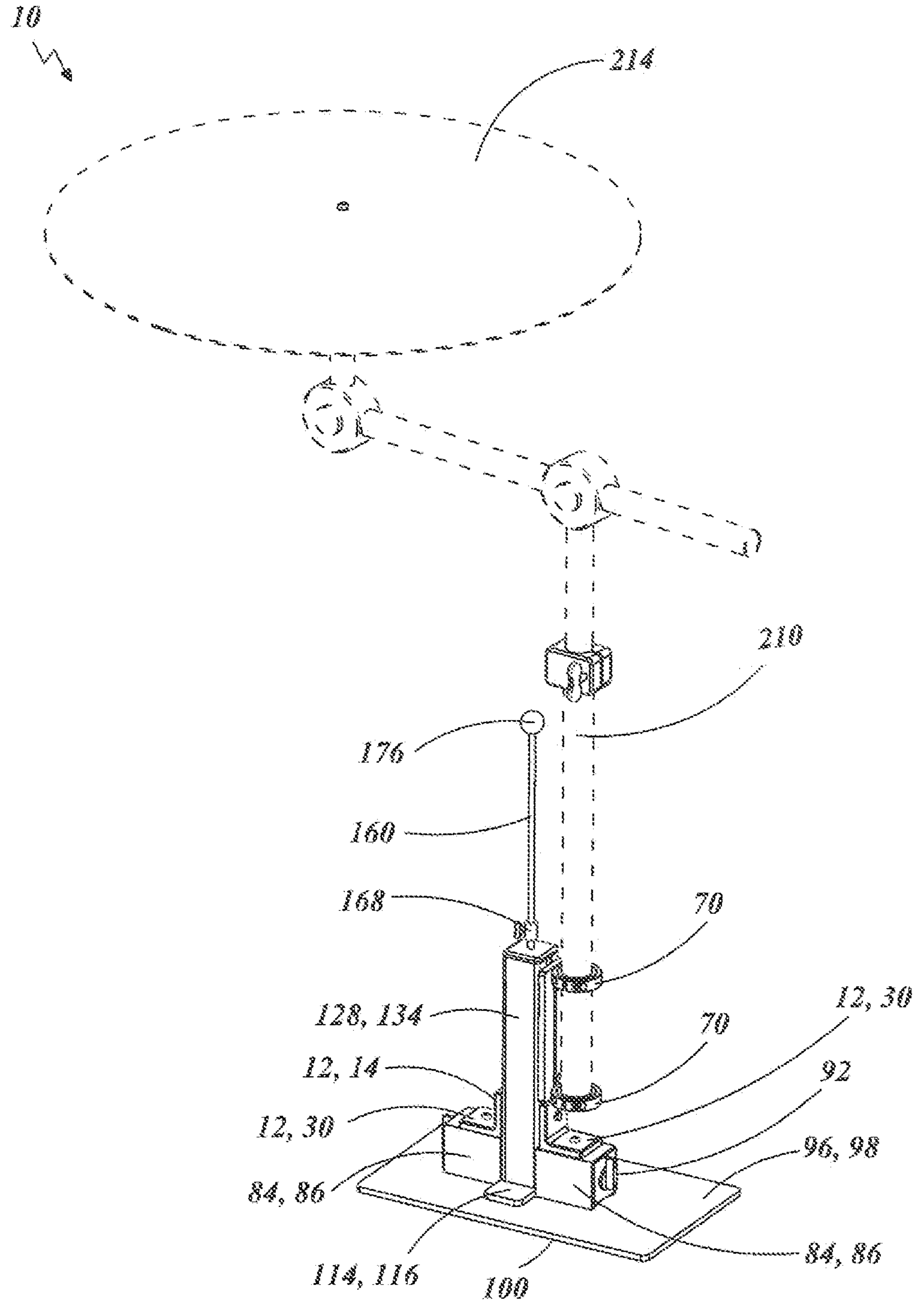
FIG. 14 is an orthographic view showing the ISAB with a cymbal attached to a support tube.

Located above the angled brace 12, and upon the vertical strut is the collar base 62. As shown in FIGS. 1-3, 8, 9, 11 and 14, the collar brace 52 has a rear, vertical member 54 with an upper edge 56, a lower edge 58, a first side edge 60, a second side edge 62, a front surface 64, and a rear surface 66. Attached to the front surface 64 of the collar brace 52 is at least two retaining collars, an upper retaining collar 70 and a lower retaining collar 76. The retaining collars can be comprised of a one-piece clamp-on shaft collar, a hinged one-piece clamp-on shaft collar, a two-piece clamp-on shaft collar or a hinged two-piece pivoting clamp. When the two retaining collars are utilized, as shown in FIGS. 1-4, 8, 9, 11 and 14, there is an upper retaining collar 76 having a front semi-circular section 72 and a rear semi-circular section 74, with the two sections interfacing to create the collar, and there is a lower retaining collar 76 having a front semi-circular section 78 and a rear semi-circular section 80, with the two sections interfacing to create the retaining collar. Either the single, or the two retaining collars are secured to the collar base 52 by attachment means 82 such as a screw or bolt. The retaining collars 70,76 extend around and onto a support tube 210 which is a hardware component of a drum kit, and maintain the support tube 210 at a desired or required location/position, typically with a cymbal 214, as shown in FIG. 14, or other part of a drum kit.

Figure 8:
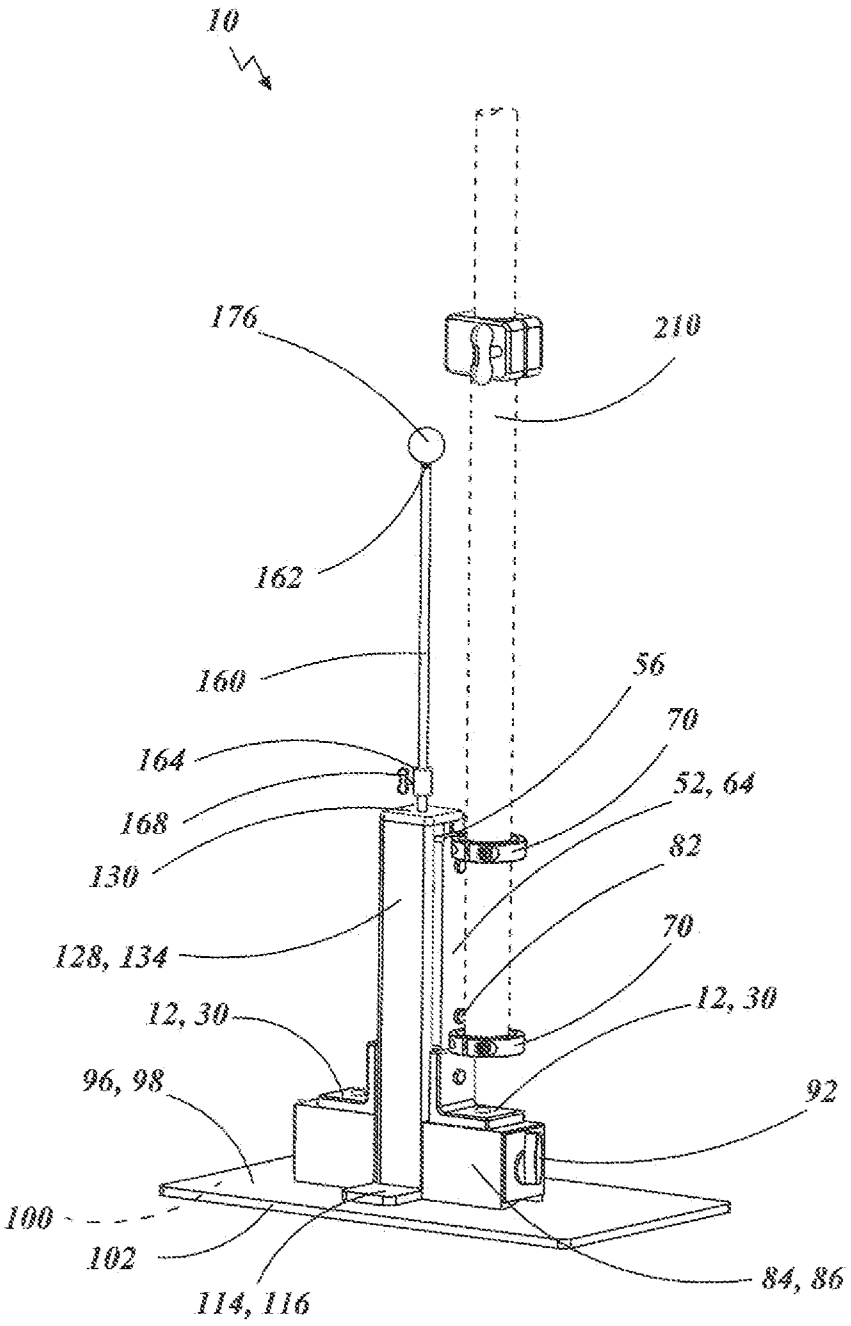
FIG. 8 is an orthographic view showing a second design configuration of the ISAB including a dampening rod with a dampening mass, a dampening rod adapter and two magnet assemblies.
Figure 9:
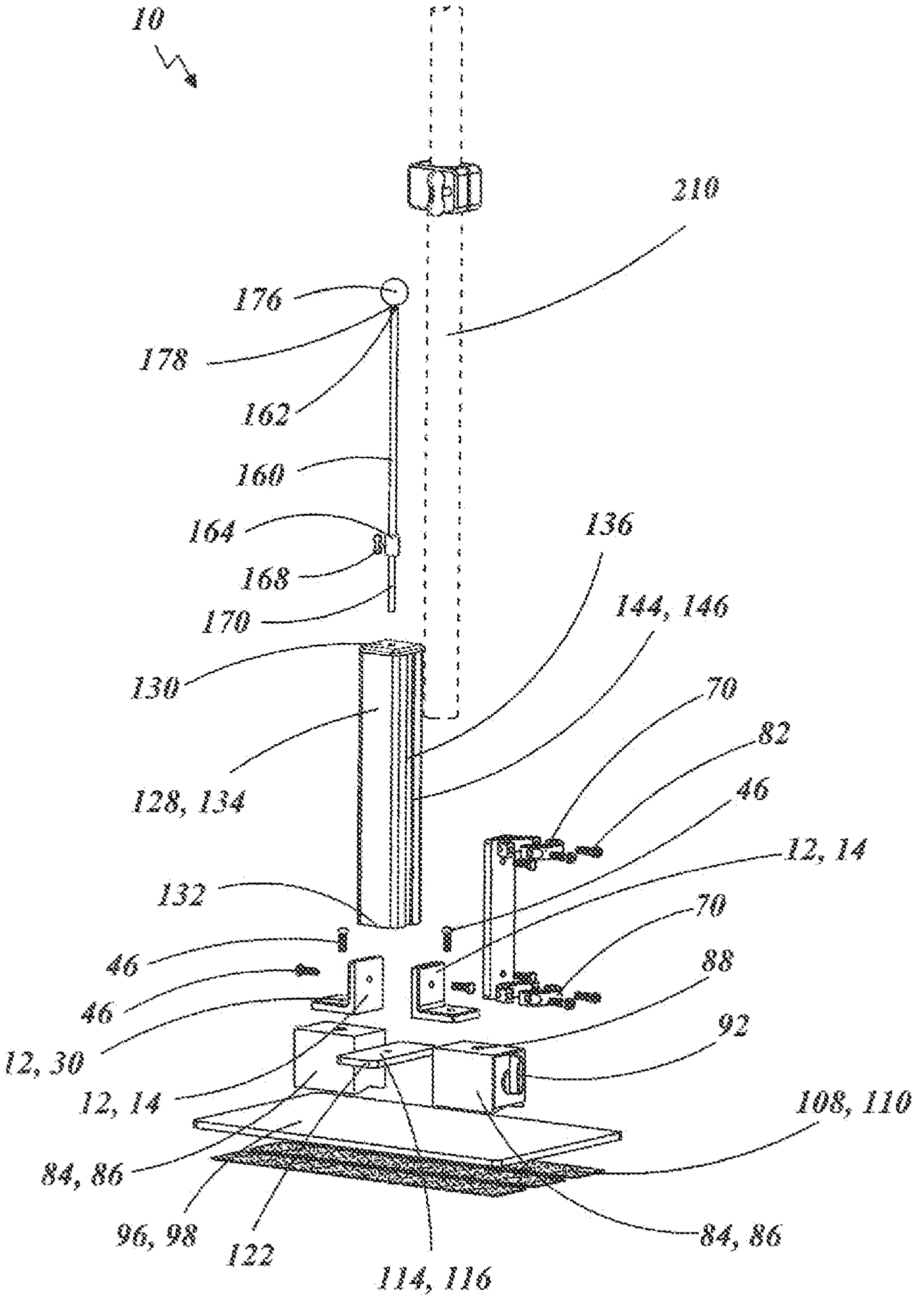
FIG. 9 is an exploded view showing a second design configuration of the ISAB including a dampening rod with a dampening mass, a dampening rod adapter and two magnet assemblies.
Figure 10:
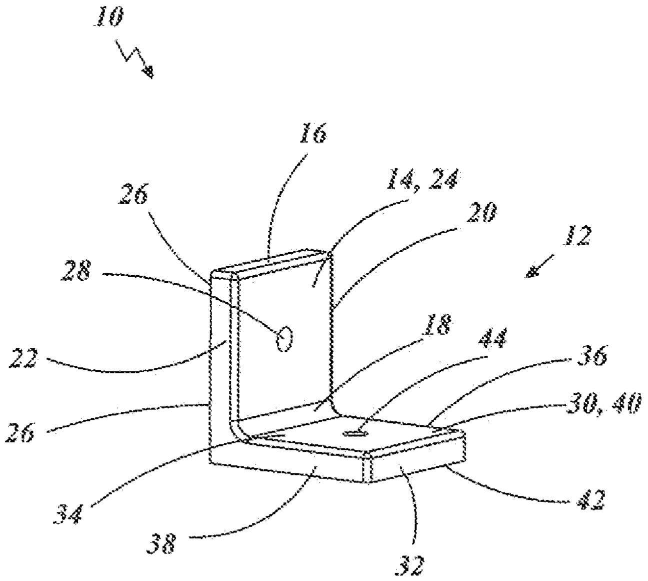
FIG. 10 is a detail view showing the ISAB collar base with two retaining collars.
Figure 11:
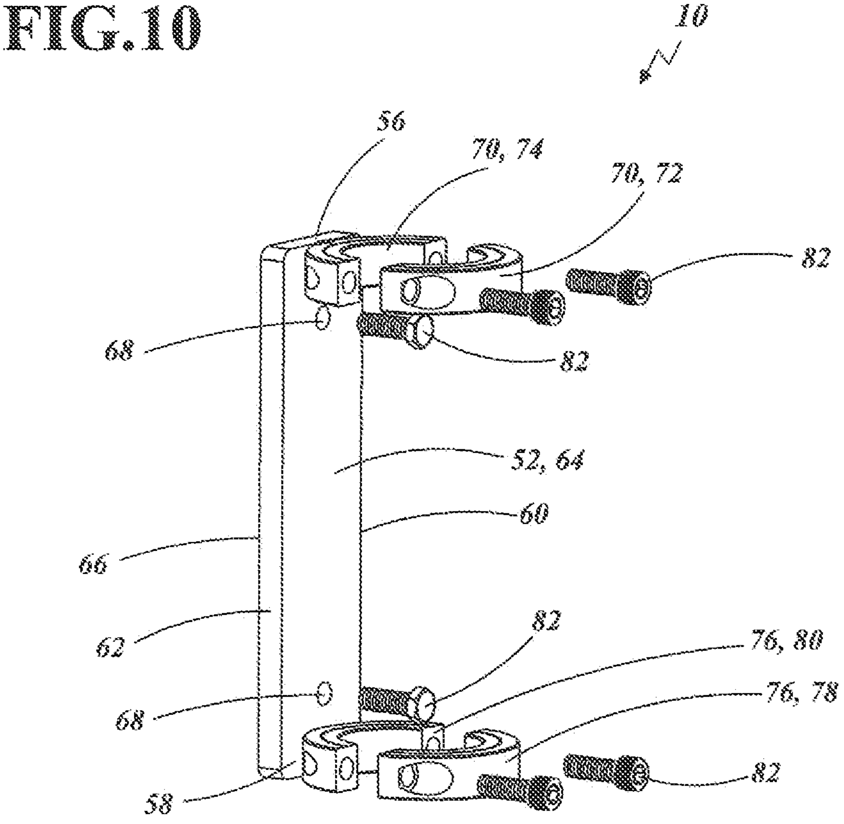
FIG. 11 is a detail view showing the ISAB angled brace.

The at least one magnet assembly 84, as shown in FIGS. 1-5, 8, 9 and 14, is comprised of an enclosure 86 with an upper threaded opening 88, a magnet 90 within the enclosure 86, and an on-off switch 92 that activates the magnet 90. When the on-off switch is in the off position, the instrument stand adapter base 10 can be freely positioned on the base plate 96, and when the on-off switch is in the on position the magnet is activated and will lock/maintain the instrument stand adapter base 10 at its location/position. When two magnet assemblies 84 are utilized, one assembly is located in front of the vertical strut 128 and one magnet assembly is located behind the vertical strut 128, as shown in FIGS. 8, 9 and 14.

Figure 7:
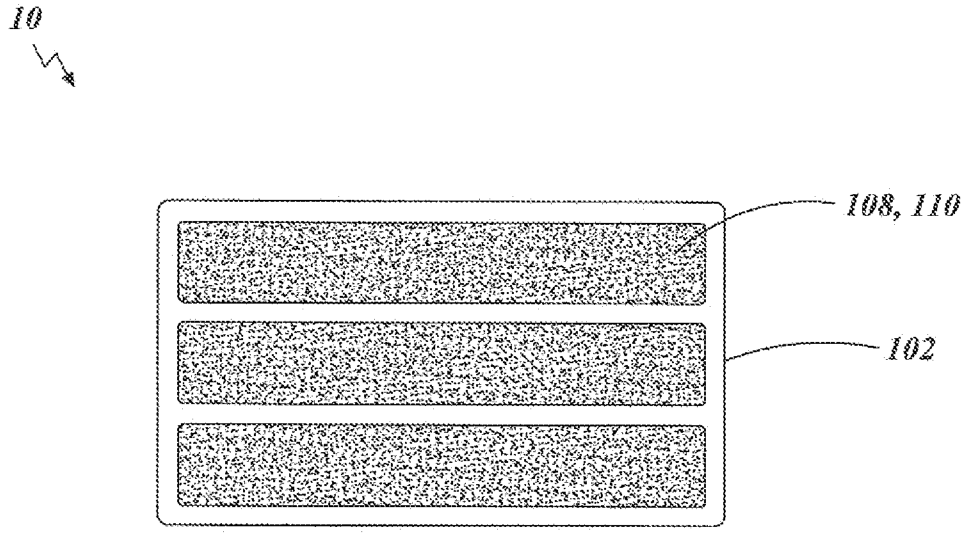
FIG. 7 is a bottom plan view showing the first design configuration of the ISAB.

Located at the bottom of the instrument stand adapter base 10 is the base plate 96, as shown in FIGS. 1-6, 8, 9 and 14, that includes an upper surface 98, a lower surface 100, and a perimeter edge 102. Base plate securing means 108 maintain the base plate 96 and instrument stand adapter base 10 in position. A preferable configuration of the base plate securing means 108, especially when the instrument stand adapter base is placed on a carpeted surface, is for the securing means 108 to comprise the book portion of a hook and loop fastener, as shown in FIGS. 7 and 9, with the carpet functioning as the loop portion. Located on the base plate 96, as shown in FIGS. 1-6, 8, 9 and 14, is the support base 114 which includes an upper surface 116, a lower surface 118, a perimeter edge 120 and an opening 122.

Extending upward from the support base 114, is the vertical strut 128, as shown in FIGS. 1-6, 8, 9 and 14, that includes an upper end 130, with an upper bore 142, a lower end 132, a first side surface 134, a second side surface 136, a third side surface 138 and a fourth side surface 140. Located in one of the side surfaces is a first extrusion 144 having a slotted profile 146. As previously disclosed in the initial paragraph, shaped nuts can be slideably inserted into the slotted profiles 140,152, thereby facilitating the easy attachment of items to the slotted surface.

Figure 12:
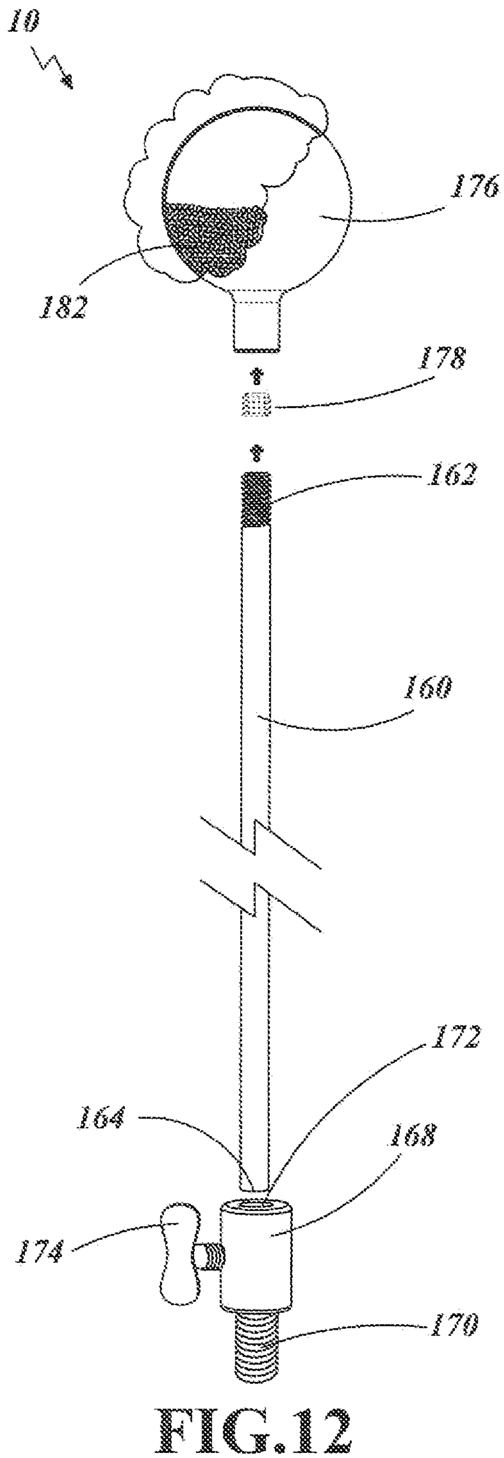
FIG. 12 is a detail view showing the ISAB dampening rod with a circular dampening mass.
Figure 13:
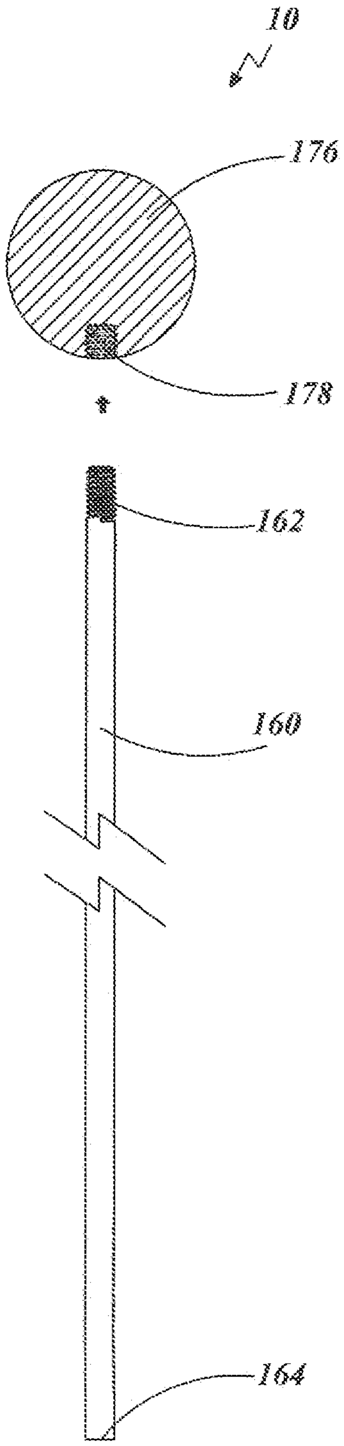
FIG. 13 is a detail view showing the ISAB dampening rod with a circular dampening mass having a portion of the mass interior filled with microspheres and the dampening rod adapter.

The second design configuration of the instrument stand adapter base 10 includes all of the elements in the first design configuration and adds a dampening rod 160 to reduce vibrations when a cymbal or snare drum is struck. As shown in FIGS. 8, 9, and 12-14, the dampening rod 160 has an upper end 162 and a lower end 164. In order to alter the position/height of the dampening rod 160, a dampening rod adapter 168 is utilized. As shown in FIGS. 8, 9, 12 and 14, the dampening rod adapter 168 comprises a threaded lower section 170 that is inserted/screwed into the upper bore 142 on the vertical strut 120, an upper bore 172, and a screw 174. Such as a thumb screw which, when loosened allows the dampening rod 160 to be raised or lowered, and when tightened, secures the dampening rod in position. The dampening rod 160, also include a dampening mass 176. The dampening mass 176 can be any shape with circular preferred. A threaded cavity 178 on a lower section of the dampening mass 176 allows the mass to be screwed onto the upper end 162 of the dampening rod 160. To increase the effectiveness of the dampening mass 176 (and dampening rod 160), a quantity of microspheres 212 can be placed within the dampening mass 176, as shown in FIG. 12.

Figure 15:
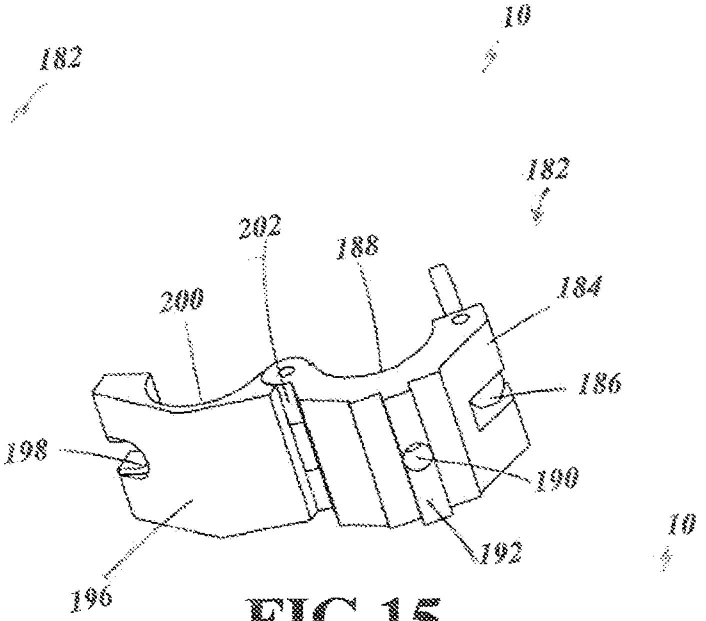
FIG. 15 is an orthographic outer view showing a retaining collar comprised of a hinged two-piece pivoting clamp in an open position.
Figure 16:
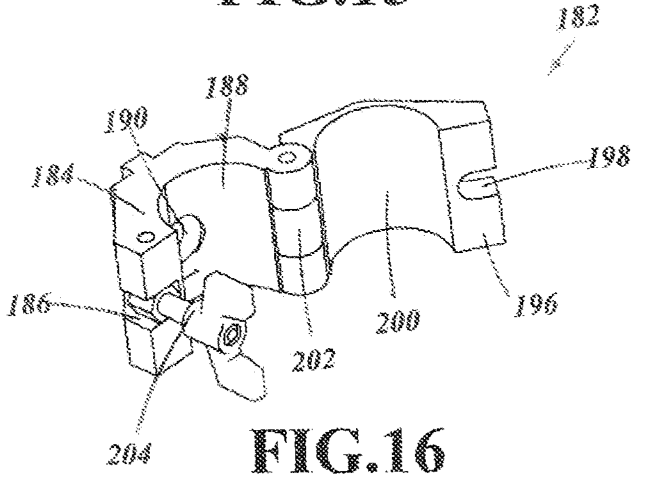
FIG. 16 is an orthographic inner view showing a retaining collar comprised of a hinged two-piece pivoting clamp in an open position, with a bolt and wing nut inserted into and extending from a securing slot.
Figure 17:
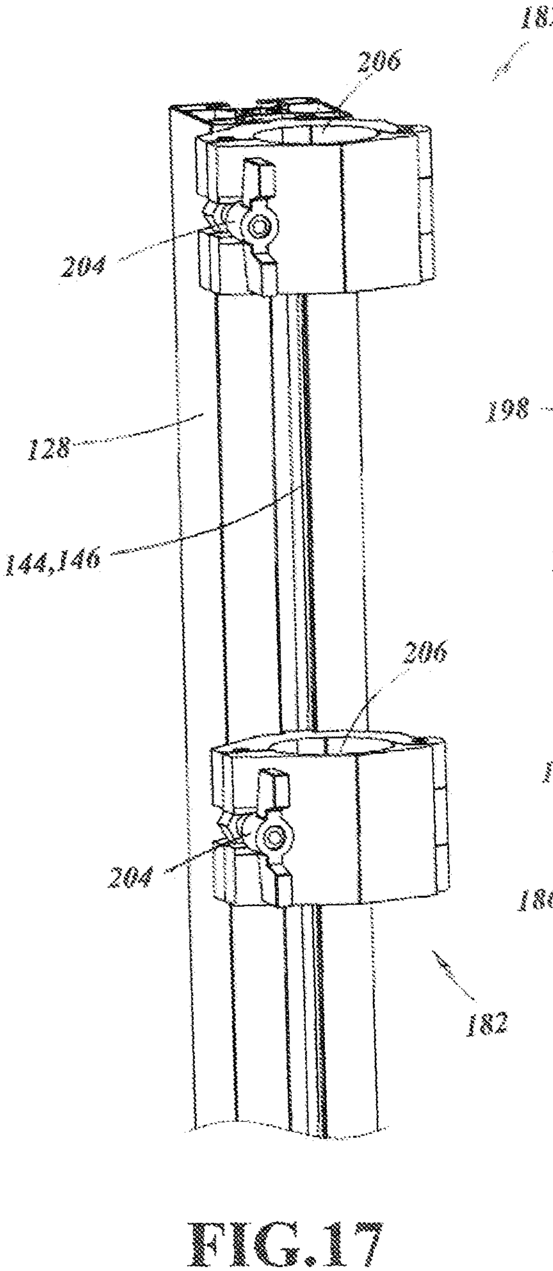
FIG. 17 is an elevational view showing two of the hinged two-piece pivoting clamps attached to an extrusion profile on a support tube.

As shown in FIGS. 15-17, the upper and lower retaining collars 70,76 can each be comprised of a hinged two-piece pivoting clamp 182 that has a first section 184 which is usually the rear of the clamp, and a second section 196, which is usually the front of the clamp. The first section 184 includes a securing slot 186, a U-shaped cavity 188 on the interior, a through-hole 190 located at the substantial center of, and extending through the cavity 188, and a slotted profile 192 extending longitudinally on the rear of the first section 184. The second section 196 includes a U-shaped slot 198 that corresponds and interfaces with the securing slot 186 on the first section 184, and a U-shaped cavity 200 on the interior that corresponds with the U-shaped cavity 188 on the first section 184 such that when the clamp 182 is in a closed position the first and second sections 184,196 are configured with a circular opening 206. A hinge assembly 202 maintains the two sections 184,196 as a single unitary element that can be opened or closed, and a bolt and wing nut 204 combination is inserted through the U-shaped slot 198 on the second section 196 and on into the securing slot 186 on the first section 184. The bolt and wing nut 204 is either tightened to maintain the clamp 182 in a closed position engaging a support tube 210 of a drum kit, or is loosened to open the clamp 182 and release the support tube 210. Essentially the clamp 182 pivots onto and around a support tube 210 and clamps the support tube in place by use of the pivoting bolt and wing nut 204.

As shown in FIG. 17, the hinged two-piece pivoting clamps 182 are attached onto the vertical strut 128 at the same location as the retaining collars 70,76 on the previous design. The clamps 182 are secured to the vertical strut 128 by inserting a screw or bolt with shaped nuts through the first section through-hole 190 and into the extrusion profile 144,146 on the vertical strut's second side surface 136.

While the invention has been described in detail and pictorially shown in the accompanying drawings it is not to be limited to such details, since many changes and modifications may be made to the invention without departing from the spirit and the scope thereof. Hence, it is described to cover any and all modifications and forms which may come within the language and scope of the claims.

The invention claimed is:

1. An instrument stand adapter base comprising:
a vertical strut having:
an upper end,
a first side surface,
a second side surface,
a third side surface,
a fourth side surface,
a first extrusion with a profile;
an angled brace comprising:
a vertical section attached to the vertical strut having:
an upper edge,
a lower edge,
a first side edge,
a second side edge,
a front surface,
a rear surface,
an opening therethrough, and
a horizontal section extending from the vertical section having:
an upper edge,
a lower edge,
a first side edge,
a second side edge,
an upper surface,
a lower surface,
an opening therethrough,
a collar base comprising:
a rear member with:
an upper edge,
a lower edge,
a first side edge,
a second side edge,
a front surface,
a rear surface attached to the profile of the extrusion,
at least one upper retaining collar extending from the front surface of the collar base,
at least one lower retaining collar extending from the front surface of the collar base,
a magnet enclosure coupled to the horizontal section of the angled brace having:
an upper threaded opening,
at least one internal magnet,
a magnet on-off switch,
a base plate magnetically attachable to the magnet enclosure comprising:
an upper surface,
a lower surface,
a perimeter edge,
at least one base plate securing means comprising a hook fastener, and
a support base attached to the vertical strut having:
an upper surface,
a lower surface,
a perimeter edge,
an opening therethrough.

2. The instrument stand adapter base of claim 1, wherein the stand is made of metal.

3. The instrument stand adapter base of claim 1, wherein the base plate is made of ferrous metal.

4. The instrument stand adapter base of claim 1, wherein the base plate securing means is comprised of a hook portion of a hook and loop fastener on the base plate, and the loop portion on a ground surface.

5. The instrument stand adapter base of claim 1, wherein the base plate securing means is comprised of a hook and loop fastener with the hook portion on the base plate, and with carpet configured as the loop portion that interfaces with the hook portion.

6. The instrument stand adapter base of claim 1, wherein the support base is made of non-ferrous metal that allows the placement of the stand to be altered when the at least one magnet is off.

7. The instrument stand adapter base of claim 1, wherein the vertical strut is made of a non-ferrous material.

8. The instrument stand adapter base of claim 1, wherein the vertical strut is made of a composite material.

9. The instrument stand adapter base of claim 1, wherein the profile in the extrusion on the vertical strut allow shaped nuts to attach the vertical section of the angled brace to the strut, with the horizontal section of the angled brace attached to the magnet enclosure.

10. The instrument stand adapter base of claim 1, wherein the upper and lower retaining collars are each comprised of a hinged two-piece pivoting clamp with two sections that are secured together by a bolt and wing nut.

11. The instrument stand adapter base of claim 1, wherein the instrument stand adapter base includes:
a dampening rod extending from the vertical strut comprising:
an upper end,
a lower end,
a threaded section,
a dampening rod retainer,
a dampening mass having:
a threaded cavity for screwing the dampening mass onto the upper end of the dampening rod, with the upper end of the rod configured with corresponding threads.

12. The instrument stand adapter base of claim 11, wherein the dampening mass is height adjustable.

13. The instrument stand adapter base of claim 11, wherein the dampening mass is solid.

14. The instrument stand adapter base of claim 11, wherein the dampening mass is hollow.

15. The instrument stand adapter base of claim 14, wherein the hollow dampening mass further comprises microspheres that are located within the dampening mass.

16. An instrument stand adapter base, comprising:
a vertical strut;
a retaining collar coupled to the vertical strut, the retaining collar being configured for attachment to a musical instrument support tube;
a magnetic assembly attached to the vertical strut and having a magnet selectively activated by a switch; and
a base plate comprised of a ferrous metal magnetically attachable to the magnetic assembly when the magnet is activated, such that the vertical strut extends from the base plate.

17. The instrument stand adapter base of claim 16, wherein the retaining collar comprises at least two retaining collars in spaced apart relation.

18. The instrument stand adapter base of claim 16, wherein a collar base connects the retaining collar to the vertical strut.

19. The instrument stand adapter base of claim 16, including an angled brace interconnecting the vertical strut and the magnetic assembly.

20. The instrument stand adapter base of claim 16, wherein the vertical strut includes a first extrusion along a length thereof having a slotted profile.

21. The instrument stand adapter base of claim 16, wherein the instrument stand adapter base includes a dampening mass associated therewith for dampening vibrations from the musical instrument tube.

22. The instrument stand adapter base of claim 21, wherein the dampening mass is attached to a rod extending from the vertical strut.

23. The instrument stand adapter base of claim 22, wherein the dampening mass is adjustable in height relative to the vertical strut.

24. The instrument stand adapter base of claim 21, wherein the dampening mass is hollow and at least partially filled with microspheres.

* * * * *